United States Patent
Hirata et al.

(10) Patent No.: US 7,234,016 B2
(45) Date of Patent: Jun. 19, 2007

(54) INFORMATION PROCESSING APPARATUS, INFORMATION PROCESSING METHOD AND INFORMATION PROCESSING PROGRAM

(75) Inventors: Mikiko Hirata, Tokorozawa (JP); Yukiko Kajita, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 337 days.

(21) Appl. No.: 10/666,524

(22) Filed: Sep. 22, 2003

(65) Prior Publication Data

US 2004/0111167 A1  Jun. 10, 2004

(30) Foreign Application Priority Data

Sep. 20, 2002 (JP) ............................ P2002-276388

(51) Int. Cl.
G06F 13/00 (2006.01)
G06F 13/36 (2006.01)
G06F 3/00 (2006.01)

(52) U.S. Cl. ...................... 710/315; 710/100; 710/305; 710/313

(58) Field of Classification Search ................. 710/36, 710/58, 62, 107
See application file for complete search history.

(56) References Cited

U.S. PATENT DOCUMENTS 6,477,589 B1* 11/2002 Suzuki et al. ................. 710/18
2001/0047440 A1* 11/2001 Takaku et al. ................. 710/62
2003/0110335 A1*  6/2003 Nguyen ....................... 710/107
2003/0221030 A1* 11/2003 Pontius et al. ............... 710/107
2004/0215855 A1* 10/2004 Fukushima et al. ......... 710/107

FOREIGN PATENT DOCUMENTS

| EP | 1 081 948 A2 | 8/2000 |
| EP | 1 104 134 A2 | 5/2001 |
| WO | WO 00/13408 A1 | 3/2000 |
| WO | WO 03/041401 A1 | 5/2003 |

* cited by examiner

Primary Examiner—Kim Huynh
Assistant Examiner—Scott Sun
(74) Attorney, Agent, or Firm—Sughrue Mion, PLLC (57) ABSTRACT

To provide an information processing apparatus and the like, in which even when a plurality of other information processing apparatuses are connected on a single serial bus system, a required one of the information processing apparatuses can be rapidly and easily selected and the information from the other information processing apparatuses can be input.

A receiver R connected to a single serial bus B together with other nodes comprises a host microcomputer 12 for selectively inputting the input information input from a plurality of input terminals and a main microcomputer 13 for acquiring the specified information for specifying the other nodes connected through the serial bus B and setting one node as an alternative of the host microcomputer 12 in place of one of the plurality of the input terminals.

11 Claims, 10 Drawing Sheets

INFORMATION PROCESSING APPARATUS, INFORMATION PROCESSING METHOD AND INFORMATION PROCESSING PROGRAM

BACKGROUND OF THE INVENTION

1. Field of the Invention

This invention relates to a technical field of an information processing apparatus, an information processing method and an information processing program, or more in particular to a technical field of an information processing apparatus connected to a single bus system together with other information processing apparatuses, an information processing program for the information processing apparatuses and an information processing method executed by the information processing apparatuses.

2. Description of the Related Art

In recent years, IEEE1394 standard has been widely applied as a standard of a method for connecting an information reproducing apparatus such as a player for reproducing the audio information recorded in an optical disc, for example, and an amplifier unit (an amplifier) for amplifying the reproduced audio information and outputting it to a speaker or the like.

The IEEE1394 standard is officially referred to as "IEEE Std. 1394–1995 IEEE Standard for a High Performance Serial Bus", which is a standard used when the information reproducing apparatus and the amplifier are connected to each other by a serial bus constituted of a wire.

Next, an outline of the IEEE1394 standard will be explained in general terms. The IEEE1394 standard (hereinafter referred to simply as the serial bus standard) stipulates that a plurality of types of information processing apparatuses (hereinafter referred to simply as nodes) including the information reproducing apparatus and the amplifier described above are connected to each other by a serial bus, and information of a plurality of channels is transmitted between the nodes by time division.

According to this serial bus standard, the control information is transmitted at high speed from an information processing apparatus such as a personal computer so that electric home appliances or audio/visual devices can be controlled centrally on the one hand and the audio information can be transmitted between the nodes both rapidly and accurately.

Assume that a plurality of nodes are connected to a serial bus based on the serial bus standard. As viewed from one of the nodes to the other plurality of nodes on the serial bus, the particular one node is connected with only one serial bus while a plurality of the nodes are existent on the particular serial bus.

When information from another node is selectively input to a given node, for example, the another node from which the information is to be input is required to be selected on the particular given node.

When information having an attribute not permitted to transmit by the serial bus standard is input from another node, on the other hand, the nodes are required to be connected to each other physically using a line for the particular information separate from the serial bus.

According to the serial bus standard described above, assume that another node is selected on one node and that a multiplicity of nodes exist on one serial bus system. In such a case, the problem is posed that a complex procedure must be followed to search for the desired node and input the information selectively.

This problem leads to another problem that the complexity is further increased by the necessity of switching the physical line connection different from the serial bus when the information having an attribute not permitted to transmit on the aforementioned serial bus standard is input to one node from another node.

SUMMARY OF THE INVENTION

This invention has been achieved in view of the problems described above, and the object of the invention is to provide an information processing apparatus, an information processing program for the information processing apparatus and an information processing method executed by the information processing apparatus, where even when a plurality of other information processing apparatuses are connected as other nodes on a single serial bus system, for example, the required single information processing apparatus can be rapidly and easily selected to input the information from the other information processing apparatuses.

The above object of the present invention can be achieved by an information processing apparatus connected to a single bus system together with other information processing apparatuses. The information processing apparatus comprises: a selecting device for selectively inputting the input information supplied from a plurality of input sources; an acquisition device for acquiring specified information for specifying the other information processing apparatuses connected through the bus; and a setting device for setting one of the other information processing apparatuses replacing one of the plurality of the input sources as an alternative in the selecting device, based on the acquired specified information.

According to the information processing apparatus, since one of the other information processing apparatuses is set replacing one of the plurality of the input sources as an alternative in the selecting device, that even when a plurality of information processing apparatuses are connected to a single bus system, the required one information processing apparatuses can be selected both rapidly and easily. In this way, the information from the particular information processing apparatuses can be input.

In one aspect of the information processing apparatus, the information processing apparatus further comprises: a first notification device for notifying the specified information corresponding to the selected one of the other information processing apparatuses when the one of the other information processing apparatuses set as one of the alternatives is selected actually as the input source; and a second notification device for notifying the one of the input sources replaced by the currently selected one of the other information processing apparatuses, in parallel with the notification by the first notification device.

According to this aspect, when the one of the other information processing apparatuses set as one of the alternatives is selected actually as the input source, the specified information corresponding to the selected one of the other information processing apparatuses and the one of the input sources replaced by the selected one of the other information processing apparatuses are notified. It is thus possible to identify the currently selected one of the other information processing apparatuses while at the same time making it possible to recognize to which one of the input sources the one of the other information processing apparatuses is assigned.

In another aspect of the information processing apparatus, the information processing apparatus further comprises a notification device for notifying only the specified information corresponding to the other information processing apparatuses supplied with the information when the information from the other information processing apparatuses not set as the alternative is input through the bus.

According to this aspect, since only the specified information corresponding to the other information processing apparatuses supplied with the information is notified when the information from the other information processing apparatuses not set as the alternative is input through the bus, that it is possible to clearly recognize that the information from the other information processing apparatuses not set as the alternative is input.

In further aspect of the information processing apparatus, the setting device includes: an extraction device for extracting, based on the acquired specified information, only those of the other information processing apparatuses meeting the conditions selectable as the alternative among the plurality of the other information processing apparatuses in setting one of the other information processing apparatuses as the one of the alternatives; and a display device for displaying only the extracted other information processing apparatuses.

According to this aspect, since, in setting one of the other information processing apparatuses as the one of the alternatives, only the extracted other information processing apparatuses meeting the conditions selectable as the alternative among the plurality of the other information processing apparatuses is displayed, that other information processing apparatuses failing to meet the required conditions is prevented from being assigned.

In further aspect of the information processing apparatus, the information processing apparatus further comprises a storage device for storing the acquired specified information.

According to this aspect, since the acquired specified information is stored in the storage device, that even when the other information processing apparatuses set replacing one of the plurality of the input sources is reconnected to the bus system after being separated from the bus system, the particular other information processing apparatuses can be assigned to the one of the plurality of the input sources without repeating the assignment process.

In further aspect of the information processing apparatus, the bus is a serial bus based on IEEE 1394 standard.

According to this aspect, since the bus is a serial bus based on IEEE 1394 standard, that the information can be transmitted/received speedy.

The above object of the present invention can be achieved by an information processing method executed by an information processing apparatus connected to one bus system together with other information processing apparatuses, the method comprising: a selecting process for selectively inputting the input information supplied to each of the information processing apparatuses from a plurality of input sources; an acquisition process for acquiring the specified information for specifying the other information processing apparatuses connected through the bus; and a setting process for setting the one of the other information processing apparatuses, as an alternative in the selecting process, in place of any one of the plurality of the input sources based on the acquired specified information.

According to the information processing method, since one of the other information processing apparatuses is set replacing one of the plurality of the input sources, that even when a plurality of information processing apparatuses are connected to a single bus system, the required one information processing apparatuses can be selected both rapidly and easily. In this way, the information from the particular information processing apparatuses can be input.

The above object of the present invention can be achieved by a computer data signal embodied in a carrier wave. The computer data signal represent a sequence of instructions, which executed by a computer included in an information processing apparatus connected to one bus system together with other information processing apparatuses, the instructions cause the computer to function as: a selecting device for selectively inputting the input information supplied from a plurality of input sources; an acquisition device for acquiring specified information for specifying the other information processing apparatuses connected through the bus; and a setting device for setting one of the other information processing apparatuses replacing one of the plurality of the input sources as an alternative in the selecting device, based on the acquired specified information.

According to the computer data signal, the computer reads out the computer data signal from the carrier wave. Since the computer functions in such a manner that one of the other information processing apparatuses is set replacing one of the plurality of the input sources, that even when a plurality of information processing apparatuses are connected to a single bus system, the required one information processing apparatuses can be selected both rapidly and easily. In this way, the information from the particular information processing apparatuses can be input.

DESCRIPTION OF THE PREFERRED EMBODIMENTS

Next, preferred embodiments of the invention will be explained with reference to the drawings.

The embodiments described below refer to a case of application of the invention to an information reproducing system comprising a player for reproducing the dynamic image information (hereinafter assumed to include the audio information) recorded in an optical disc such as a DVD (digital versatile disc), a receiver for amplifying and shaping the waveform of, as predetermined, the dynamic image information reproduced by the player and outputting (sounding) the audio information through a speaker while at the same time displaying the image information on a display unit, and a serial bus for connecting the player and the receiver to each other by wire according to the serial bus standard.

(I) About IEEE1394 Standard

Before explaining an embodiment specifically, the serial bus standard applicable to the embodiment will be explained briefly.

Generally, the serial bus standard stipulates that a plurality of the nodes are connected by a serial bus and the transmission of information equivalent to a plurality of channels (according to this standard, a maximum of 63 different channels can be used for information transmission within the same series connected by a single serial bus system) is executed by time division between the individual nodes.

The serial bus standard also provides that when the nodes connected mutually by a serial bus are connected with a new node (i.e. at the time of bus connection) or when one of the nodes is disconnected from the node group (i.e. at the time of bus disconnection), the serial bus is initialized in the bus reset. With the bus reset, the following-described process is executed so that a new serial bus connection (hereinafter referred to as the topology) is constructed.

(1) Upon occurrence of a case of a bus reset, a node that has detected the generation of the bus reset (i.e. a node with another node newly connected thereto or a node from which another node is disconnected) sends out a bus reset signal indicating the occurrence of a case of a bus reset to all the nodes connected to the serial bus.

(2) Next, after the bus reset, a tree identification is carried out to connect each node on the tree. The node located at the top of the tree thus connected is recognized as a root node.

(3) Next, the root node thus recognized causes each node to recognize the identification (ID) number unique to the particular node for identification in the tree.

(4) Next, the communication status of all the nodes in the tree thus formed (specifically, the channel used and the time occupied by each node for transmission) is managed, and an IRM (Isochronous Resource Manager) node is set which identifiably indicates the channel currently used by other nodes and the time currently occupied by each node for transmission).

(5) Finally, a bus manager node is installed which coordinates the information transmission status of all the nodes.

Through the aforementioned five stages of processing, a new topology is constructed after a case of a bus reset.

In an actual case where information is transmitted after topology construction, a transmitting node which is a node about to start to transmit the information refers the current communication status of the other nodes to the IRM node. Thus, when a channel and the transmission time which the transmitting node desires to exclusively occupy are available, the transmitting node acquires the right to transmit the information (more specifically, the transmitting node secures a channel and the transmission time to be occupied exclusively by itself) and starts the information transmission. Immediately before the transmission of the information, the transmitting node notifies the IRM node that the indication of the communication status in the IRM node is rewritten (specifically, since the occupied channel and the occupied transmission time on the serial bus are changed by the start of information transmission by the transmitting node, the contents of the display are required to be rewritten to the new communication status after the particular change). Upon receipt of this notification, the IRM node executes the process for updating the contents of display. After that, the updated contents of display can be accessed individually by other nodes.

Next, the exclusively occupied transmission time will be described briefly.

According to IEEE1394 standard, the information from the nodes is transmitted collectively in units called the isochronous cycle (where "cycle" indicates one cycle formed by time division on the serial bus). The isochronous cycle includes an isochronous transmission area containing the information (specifically, the image information, the audio information, etc.) transmitted in synchronism with the information contained in other isochronous cycles and an asynchronous transmission area containing the information (specifically, the control information for controlling the output, etc. of the image information or the audio information) transmitted asynchronously without regard to other information. The information existing in the isochronous transmission area is divided by time for each different channel so that different information is transmitted for each channel.

According to the serial bus standard, the time length of the isochronous transmission area in each isochronous cycle is 100 μsec in maximum, and therefore the total time which the information assigned to each one channel in each isochronous transmission area occupies for transmission is also required to be not more than 100 μsec. The transmission time exclusively occupied by the particular one channel in the isochronous cycle is the (exclusively) occupied transmission time.

The occupied transmission time is sometimes called the occupied serial bus band or the occupied serial bus capacity. When the length of the isochronous transmission area in one isochronous cycle is less than 100 μsec (including zero), on the other hand, the time other than the particular isochronous transmission area in the isochronous cycle is used exclusively as an asynchronous transmission area.

Figure 1:
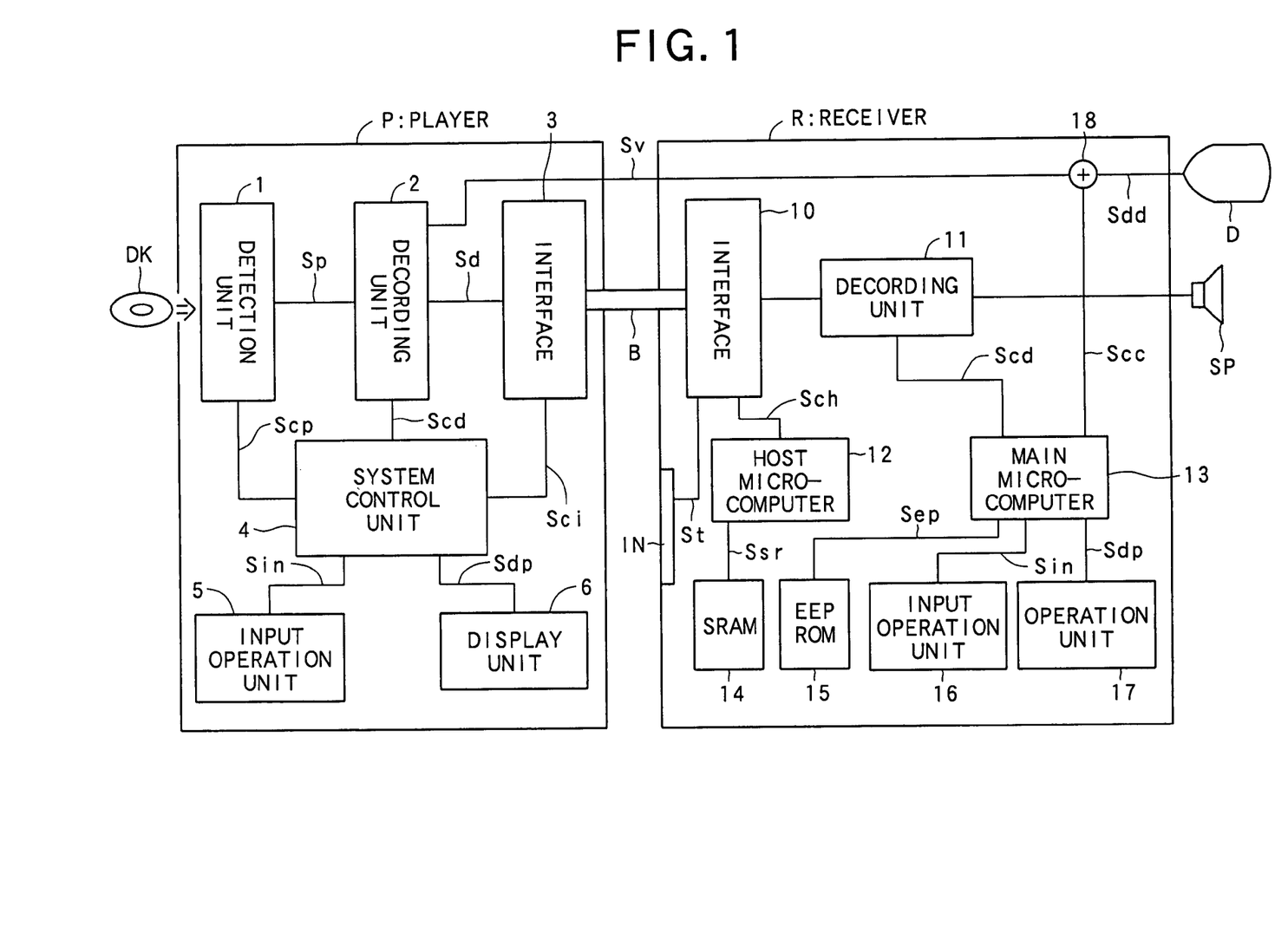
FIG. 1 is a block diagram showing a general configuration of an information reproducing system according to an embodiment.

(II) DETAIL OF EMBODIMENTS (A) Description of General Configuration and Overall Operation Next, the general configuration of an information reproducing system according to an embodiment for transmitting the dynamic image information under the serial bus standard described above will be explained with reference to FIG. 1. FIG. 1 is a block diagram showing an outline of the configuration of the player and the receiver included in the information reproducing system according to the embodiment.

As shown in FIG. 1, the information reproducing system S according to this embodiment is configured of a player P constituting one of other information processing apparatuses, a receiver R constituting one information processing apparatus and a serial bus B for connecting the player P and the receiver R according to the serial bus standard.

The player P includes a detection unit 1, a decoding unit 2, an interface 3, a system control unit 4, an input operation unit 5 and a display nit 6.

The receiver R, on the other hand, is configured of an input terminal unit IN including a plurality of input terminals each connected with a device not governed by the serial bus standard, an interface 10, a decoder 11, a host microcomputer 12 forming a selecting device, a main microcomputer 13 forming an extraction device, an acquisition device and a setting device, a SRAM (Static Random Access Memory) 14 forming a storage device, an EEPROM (Electric Erasable and Programmable Read-Only Memory) 15, an input operation unit 16, a display unit 17 forming a notification device including a first notification device and a second notification device, and an adder 18. The receiver R is connected with a display D forming a display device and a speaker SP.

Next, the overall operation will be explained.

First, the detection unit 1 in the player P includes a spindle motor for rotating an optical disc DK such as a DVD with dynamic image information recorded therein, a pickup for optically detecting the dynamic image information from the optical disc DK in rotation, and a processing unit set in advance for pre-processing such as amplification of the detected dynamic image information. Once the optical disc DK is loaded, the dynamic image information recorded in the optical disc DK is optically detected under the control of the system control unit 4 using a control signal Scp, and a detection signal Sp corresponding to the detected dynamic image information is generated and output to the decoding unit 2.

The decoding unit 2 decodes the dynamic image information contained in the detection signal Sp under the control of the system control unit 4 using the control signal Scd, and generating the decoding signal Sd containing only the audio information in the decoded dynamic image information, outputs it to the interface 3.

In parallel with this, the decoding unit 2 decodes the dynamic image information contained in the detection signal Sp under the control of the system control unit 4 using the control signal Scd, and generating the image decoding information Sv containing only the image information in the decoded dynamic image information, outputs it directly to an image input terminal not shown of the receiver R. In the process, the transmission of the image decoding information Sv from the player P to the receiver R is required to comply with the serial bus standard.

Next, the interface 3 subjects the decoding information Sd after decoding to the output interface processing based on the serial bus standard under the control of the system control unit 4 using the control signal Sci, and outputs the player output information to the receiver R through the serial bus B. In the process, the interface 3 divides the audio information contained in the decoding information Sd into isochronous packets (including the required sync information or the like), and forming the player output information described above, sends it onto the serial bus B.

On the other hand, a series of the processes for controlling the operation of the player P described above is carried out by the operator by way of the input operation unit 5, so that an operation signal Sin corresponding to the operation thus carried out is generated and output to the system control unit 4.

The system control unit 4 generates and outputs the control signals Scp, Scd and Sci for controlling the component members based on the operation signal Sin in order to perform the overall control operation of the component members of the player P in such a manner as to realize the process shown in the flowchart described later.

Further, the information to be presented to the operator in the overall control operation of the system control unit 4 is output from the system control unit 4 as display information Sdp.

The display unit 6 made up of a liquid crystal display unit or the like displays the information to be presented to the operator, based on the display information Sdp.

On the other hand, the interface 10 of the receiver R for receiving the player output information output from the interface 3 executes the input interface process according to the serial bus standard against the player output information output through the serial bus B, and outputs the receiving information Sr to the decoding unit 11.

In the process, the operation of the interface 10 is carried out under the control of the host microcomputer 12 using the control signal Sch. The information required for controlling the operation of the interface 10 by the host microcomputer 12 is temporarily stored as memory information Ssr in the SRAM 14 while at the same time being read out as memory information Ssr as required and used for controlling the interface 10. Further, the operation of controlling the interface 10 by the host microcomputer 12 is centrally controlled by the main microcomputer 13 based on the control signal Scm from the main microcomputer 13.

Next, the audio information contained in the receiving information Sr generated is subjected to a predetermined receiving process such as amplification and waveform shaping under the control of the main microcomputer 13 using the control signal Scd. Thus, the output information So corresponding to the audio information is generated and output to an external speaker SP.

As a result, the speaker SP releases the audio information contained in the output information So as a sound.

On the other hand, the process for controlling a series of the operations of the receiver R described above is carried out by the operator through the input operation unit 16. Thus, an operation signal Sin corresponding to the process thus carried is generated and output to the main microcomputer 13.

The main microcomputer 13 generates and outputs the control signals Scm and Scd to control the component members based on the operation signal Sin in order to perform the centralized control of the component members of the receiver R including the host microcomputer 12 in such a manner as to realize the process shown in each of the flowcharts described later. The information required for controlling the operation of the host microcomputer 12 by the main microcomputer 13 are temporarily stored as the memory information Sep in the EEPROM 15 while at the same time being read out as the memory information Sep and used for the same control operation as required.

Further, part of the information to be presented to the operator for the centralized control operation by the main microcomputer 13 is output as display information Sdp from the main microcomputer 13.

The display unit 17 including a liquid crystal display is adapted to display the aforementioned information to be presented, based on the display information Sdp.

That part of the information to be presented to the operator which cannot be displayed on the display unit 17 is output as display information Scc from the main microcomputer 13, and output to an external display D as display information Sdd through an adder 18. In this way, the required information can be presented.

On the other hand, the image decoding information Sv directly output from the decoding unit 2 in the player P is output as display information Sdd to the external display D through the adder 18. Thus, a corresponding dynamic image is displayed.

The information from a device connected to any one of the input terminals in the input terminal unit IN is output to the interface 10 as terminal information St based on the switching process of the input terminal performed by the host microcomputer 12. Under the control of the host microcomputer 12 using the control signal Sch, the same information is output to the decoding unit 11 through the interface 10 and decoded.

(B) Device Recognition Process According to Embodiments

Next, before specifically explaining the device assigning process executed by the receiver R according to an embodiment of the invention, the device recognition process executed by the receiver R as a prerequisite for the device assigning process will be specifically explained with reference to FIGS. 2 and 3.

Figure 2:
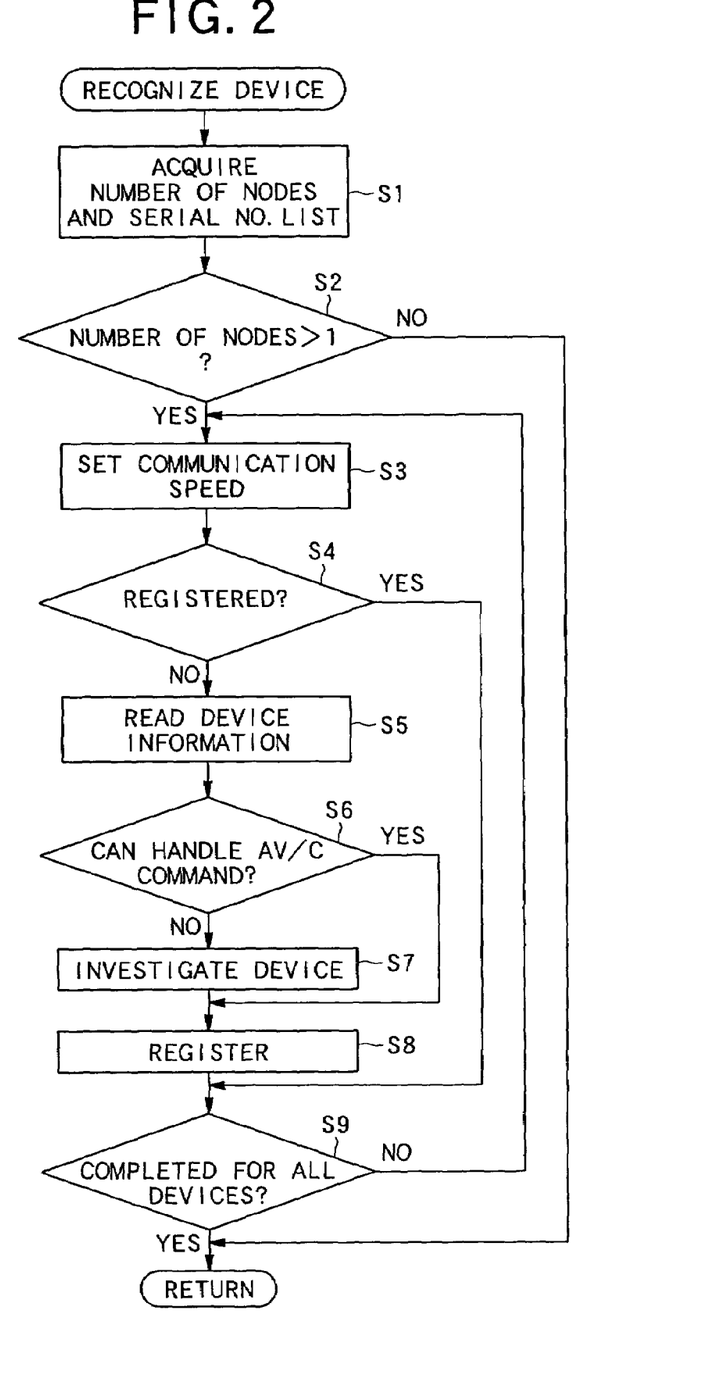
FIG. 2 is a flowchart showing the device recognition process according to an embodiment.
Figure 3:
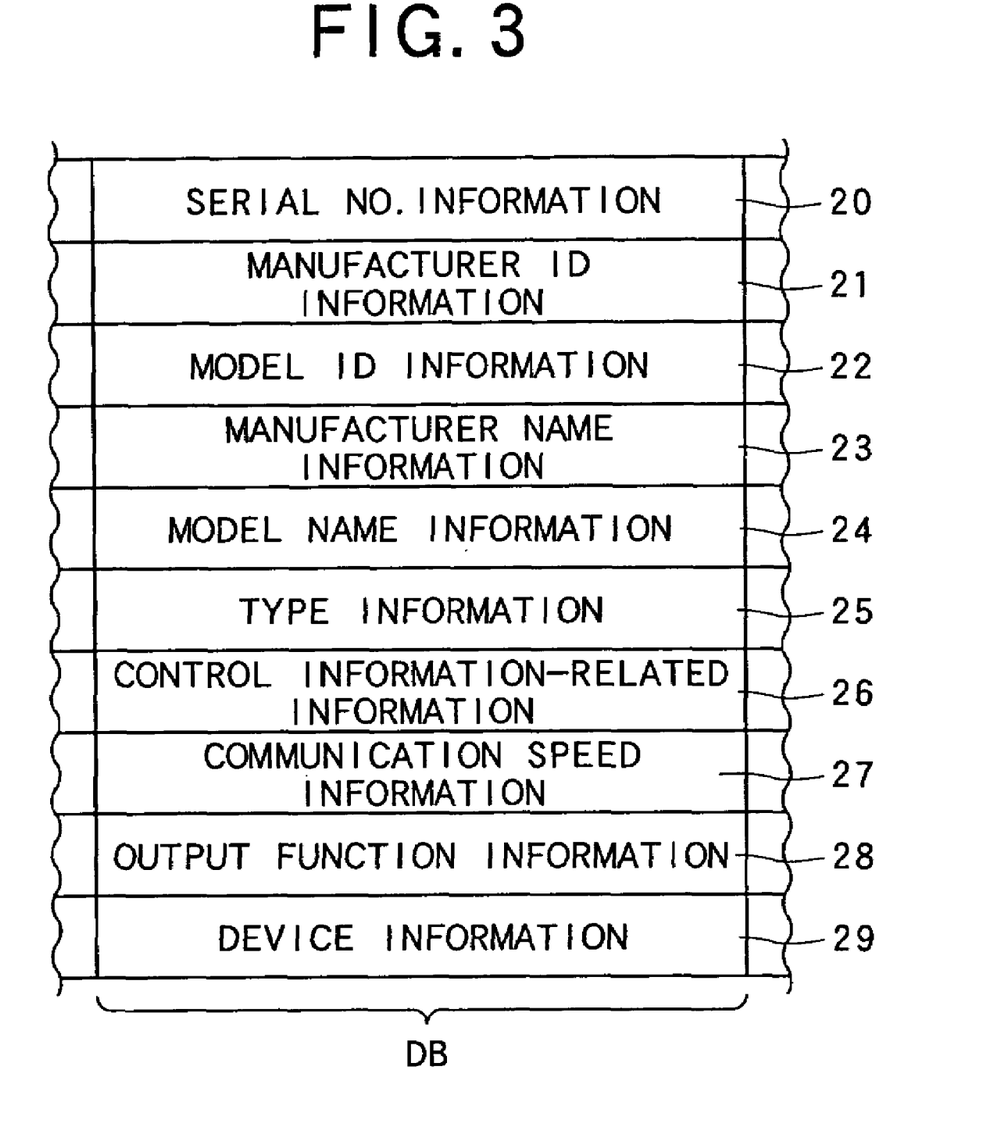
FIG. 3 is a diagram illustrating the contents of the device recognition data base according to an embodiment.

FIG. 2 is a flowchart showing the device recognition process, and FIG. 3 is a diagram illustrating the contents of the device recognition data base formed in each node including the receiver R as the result of the device recognition process.

The device recognition process explained below is carried out by each node (including the player P and the receiver R according to the embodiment) connected to the serial bus B which is reset immediately after generation of a bus reset. This is a process for grasping the status of other nodes connected to the serial bus B after the reset operation for each node.

The device recognition process according to an embodiment of the invention is executed by other nodes recognizing the contents of the device information (called "Configuration ROM" under the serial bus standard) stored in the device information ROM of each node.

Specifically, in the device recognition process according to this embodiment, the number of nodes connected to the serial bus B after the occurrence of a first bust reset, if any, is acquired, while at the same time acquiring the serial number of each node in the device information in each node (the number is different from one node to another and called "GUID (global unique identification)" according to the serial bus standard) (step S1).

Next, it is confirmed whether the number of nodes acquired in step S1 is larger than 1 (step S2), and when the number of nodes is not more than 1 (NO in step S2), it indicates that any node conforming with the serial bus standard is not currently connected other than the receiver R which is executing the device recognition process shown in FIG. 2. Therefore, the device recognition process under the serial bus standard is finished.

When it is determined in step S2 that the acquired number of nodes is larger than 1 (YES in step S2), on the other hand, the communication speed information in the device information of each node is acquired and the communication speed is set for the serial bus B as of that particular time point (step S3).

Next, based on the serial number acquired in step S1, it is confirmed whether the node corresponding to the same serial number is registered in the device recognition data base or not (step S4). When the registration is completed (YES in step S4), the registration is needed no longer and therefore the process directly proceeds to step S9 as described later.

When it is determined in step S4 that the node is not yet registered (NO in step S4), on the other hand, the device information in the unregistered node is read (steps S5). The device information read in the process of step S5 specifically include the manufacturer ID information of the corresponding node, the model ID information, the information as to whether the particular node is based on the format of the AV/C (Consumer Audio/Video) command (officially called "AV/C digital interface command set") well known as an instruction format determined under the serial bus standard, the manufacturer's name information, the model name information and the ID information of the node on the serial bus B.

Upon complete reading of the device information, it is determined whether the corresponding node meets the AV/C command format, based on the device information thus read (step S6). When the corresponding node fails to be based on the AV/C command format (NO in step S6), the device recognition under the serial bus standard is not required, and therefore the fact is stored in the SRAM 14 (step S8).

When it is determined in step S6 that the corresponding node meets the AV/C command format (YES in step S6), on the other hand, the attribute, etc. of the particular node is investigated using the AV/C command (step S7).

The process of step S7 specifically is intended to confirm the attribute of the particular node (whether the player or the receiver), the attribute of each function of the particular node (whether it has the recording function or the reproducing function), and the number of the information input/output terminals of the node, and whether the particular input/output terminals and the interface connected to each input/output terminal are permitted to perform the receiving/transmission process based on the A&M (Audio and Music) protocol well known as a protocol (communication rule) determined under the serial bus standard. The contents of this processing are stored in the SRAM 14 (step S8).

For all the nodes currently connected to the serial bus, it is confirmed whether the process of steps S3 to S9 is finished or not (step S9). When the process is not finished for all the nodes (NO in step S9), the process returns to step S3 to execute the process of steps S3 to S9 for the nodes for which the particular process is yet to be completed. When the required process is complete for all the nodes (YES in step S9), on the other hand, the device recognition process according to this embodiment is completed.

Next, the device recognition data base formed in the SRAM 14 upon completion of the device recognition process shown in FIG. 2 will be explained with reference to FIG. 3.

After completion of the device recognition process shown in FIG. 2, the device recognition data base DB is formed on the SRAM 14 for each node currently effectively connected to the serial bus. Specific contents of the device recognition data base DB include the serial number information 20 indicating the serial number of a given node (step S1 in FIG. 2), the manufacturer ID information 21 indicating the manufacturer of the particular node (step S5 in FIG. 2), the model ID information 22 indicating the model of the node (step S5 in FIG. 2), the manufacturer name information 23 indicating the name of the manufacturer of the node (S5 in FIG. 2), the model name information 24 indicating the name of the model of the node (step S5 in FIG. 2), the type information 25 indicating the attribute of the node (step S7 in FIG. 2), the control information-related information 26 indicating whether the particular node corresponds to the control information transmitted using the asynchronous transmission area or not (step S7 in FIG. 2), the communication speed information 27 (step S3 in FIG. 2), the output function information 28 relating to the output function of the node (step S7 in FIG. 2), and the device information 29 indicating the other states of the node (the ID information and the double device information for a node in the serial bus B, for example).

(C) Embodiments for Device Assignment Process

Next, the device assignment process based on the completion of the function recognition process, as a prerequisite, according to an embodiment will be explained below with reference to FIGS. 4 to 6.

Figure 4:
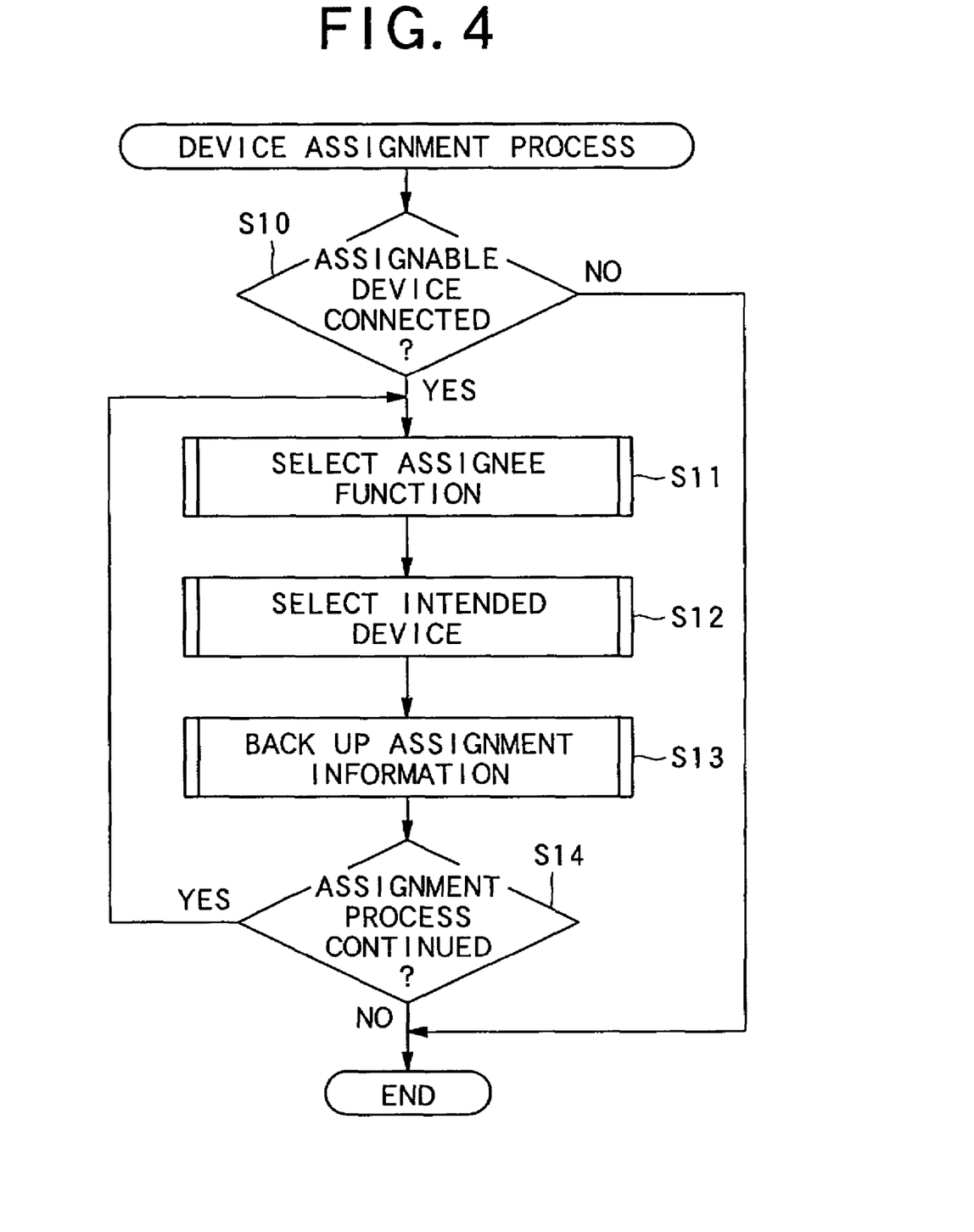
FIG. 4 is a flowchart showing the device assignment process according to an embodiment.
Figure 5:
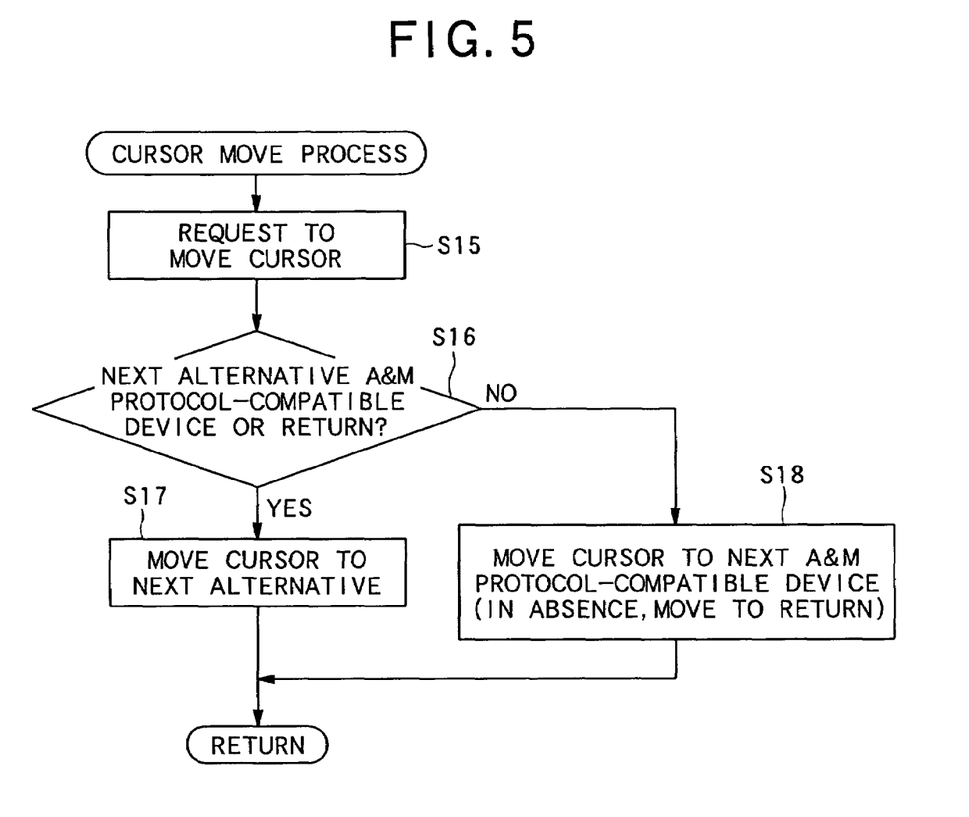
FIG. 5 is a flowchart showing the cursor movement process according to an embodiment.
Figure 6:
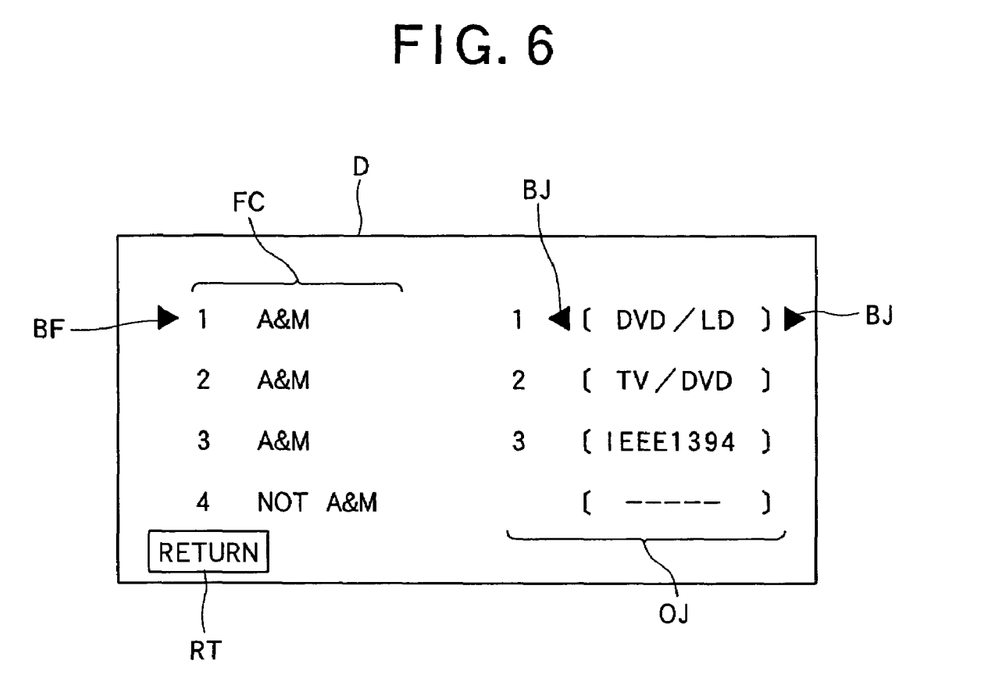
FIG. 6 is a diagram illustrating the select screen according to an embodiment.

FIG. 4 is a flowchart showing the whole of the device assignment process according to an embodiment, FIG. 5 a flowchart showing the details of the same device assignment process, and FIG. 6 shows an example of the screen displayed on the display D based on the display information Scc at the time of execution of the device assignment process.

The device assignment process described below is such that a given node connected to the receiver R under the serial bus standard is assigned to any of alternatives provided for selecting non-applicable devices (such as the television set, the video cassette recorder or the analog record player) directly connected to a plurality of input terminals of the input terminal unit IN of the receiver R and not conforming with the serial bus standard, in place of the non-applicable devices (connected directly to the corresponding input terminal of the receiver R) which otherwise should be selected by the particular alternative.

In the description that follows, the alternative described above will be generally referred to as "the function", the alternative for selecting the devices directly connected to the original input terminals of the receiver R as "the fixed function", and the alternative for selecting a node connected to other than the input terminal through the serial bus B under the serial bus standard as "the virtual function".

As shown in FIG. 4, the first step executed in the device assignment process according to this embodiment is to confirm whether a node based on the serial bus standard assignable to any of the fixed functions currently exists or not on the serial bus B (step S10). In the absence of any assignable node (NO in step S10), the device assignment process cannot be executed and therefore is terminated.

When a node based on the serial bus standard assignable to any of the fixed functions currently exists on the serial bus B (YES in step S10), on the other hand, the fixed function next to be assigned a node is selected (step S11). At the same time, in the process of step S11, as shown in FIG. 6, a select area FC for selecting the fixed function so assigned is displayed on the display D. By manipulating the button BF by way of the input operation unit 16 on this select area FC, the fixed function assigned is selected.

Upon completion of the selection of the fixed function, a node to be assigned to the selected fixed function is selected (step S12). At the same time, in the process of step S12, as shown in FIG. 6, a select area OJ for selecting the assigned node is displayed on the display D, and by manipulating the button BJ through the input operation unit 16 on the select area OJ, the nodes forming candidates for selection are displayed in the order of the device recognition data base DB stored on the SRAM 14. Thus, a node to be assigned to the corresponding fixed function is selected for each fixed function (displayed by the number in the select area FC).

Upon selection of the fixed function and the node to be assigned thereto, the assignment information to identify the relation between the corresponding fixed function and the node assignment is generated and stored in the EEPROM 15 (step S13).

After that, it is ascertained on the display D as to whether the device assignment process is repeated for other fixed functions (step S14). When the device assignment process is so repeated (YES in step S14), the process returns to step S11, at which a series of the device assignment process described above is executed for the next node. When the device assignment process is terminated (NO in step S14), on the other hand, the device assignment process is so terminated.

Next, the process of moving the cursor in the select area OJ on the select screen of FIG. 6 during the process of step S14 shown in FIG. 4 will be explained with reference to FIGS. 5 and 6.

As shown in FIG. 5, during the process of moving the cursor for selecting a node to be assigned to a fixed function (i.e. the cursor for displaying a node currently selected, as distinguished from other nodes), the first step is to confirm as to whether the operation to move the cursor has been performed on the input operation unit 16 or not (step S15). When the operation has been performed, it is confirmed whether the alternative of the destination (candidates of the nodes to be selected are displayed in the order of the node number on the serial bus B) is a node based on the A&M protocol or not, or whether it is the return button RT shown in FIG. 6 or not (step S16).

When the alternative of the destination is a node based on the A&M protocol or the return button RT (YES in step S16), the cursor is moved onto the particular alternative (step S17) and the original device assignment process is started.

When the alternative of the destination is neither a node based on the A&M protocol nor the return button RT (YES in step S16), on the other hand, the cursor is moved onto the node based on the A&M protocol close behind the particular alternative (step S18) thereby to start the original device assignment process. By the way, in the absence of a node based on the A&M protocol after the particular alternative in the process of step S18, the cursor is moved onto the return button RT.

(D) Function Switching Process According to Embodiment

Next, the process for switching the functions executed mainly by the main microcomputer 13 when the receiver R actually receives the dynamic image information or the like after completion of the device assignment process will be explained with reference to FIGS. 7 and 8.

Figure 7:
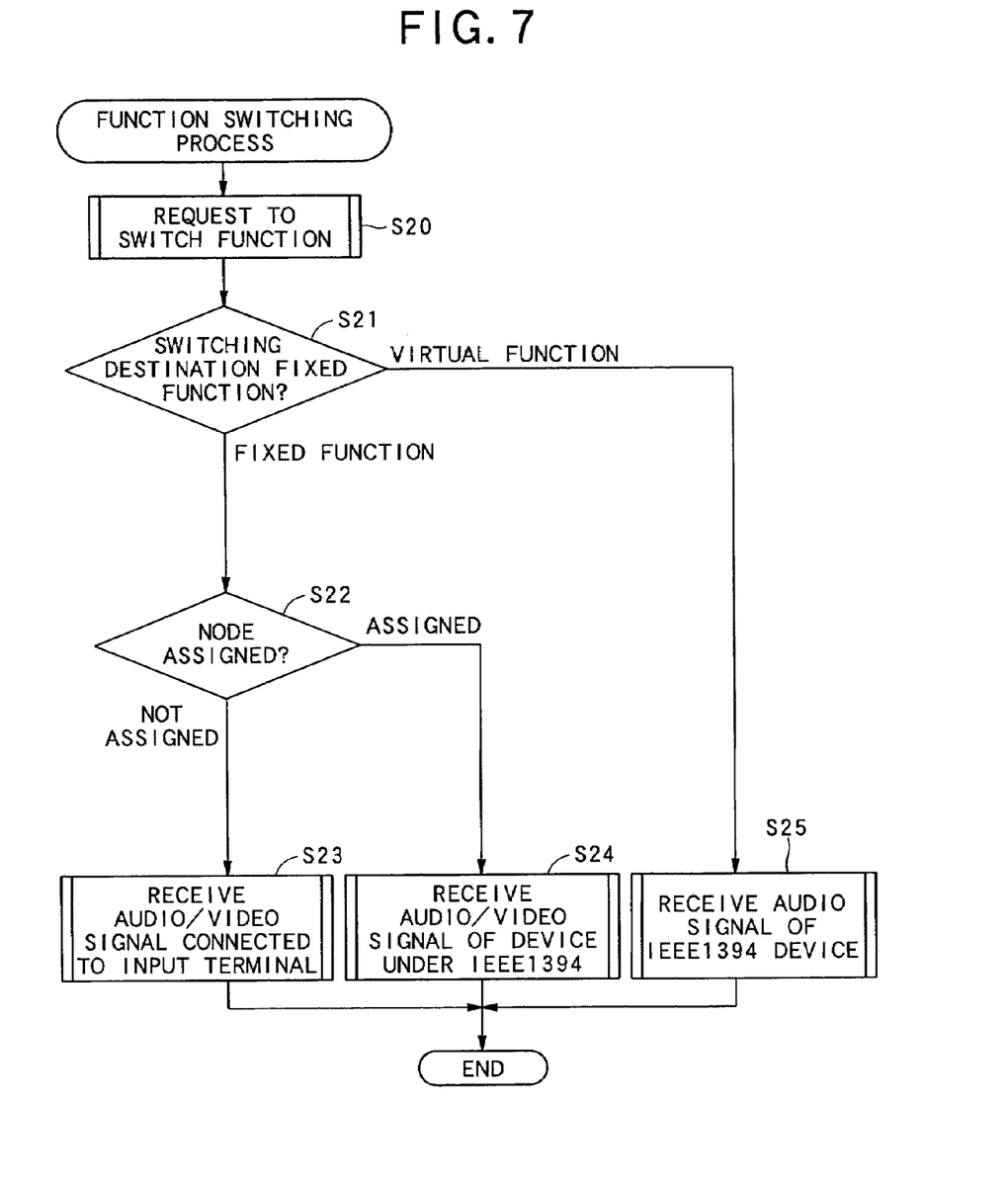
FIG. 7 is a flowchart showing the function switching process according to an embodiment.
Figure 8A:
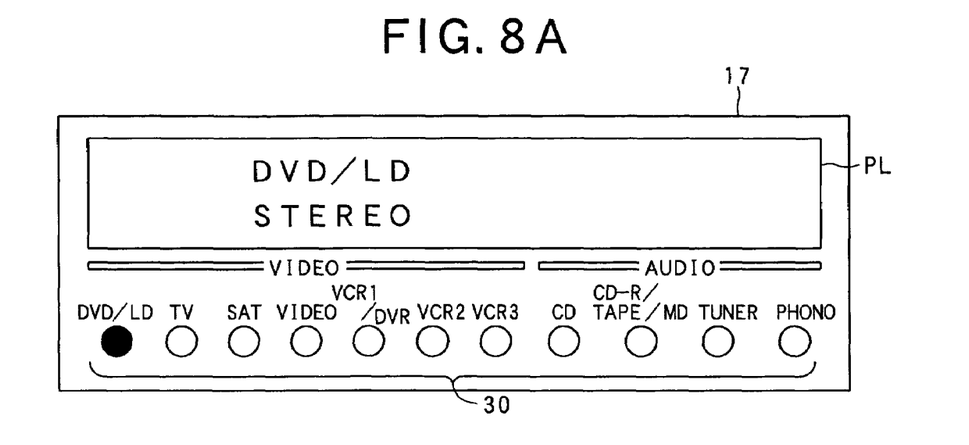
FIG. 8A is a diagram showing a first example of display screen according to an embodiment.
Figure 8B:
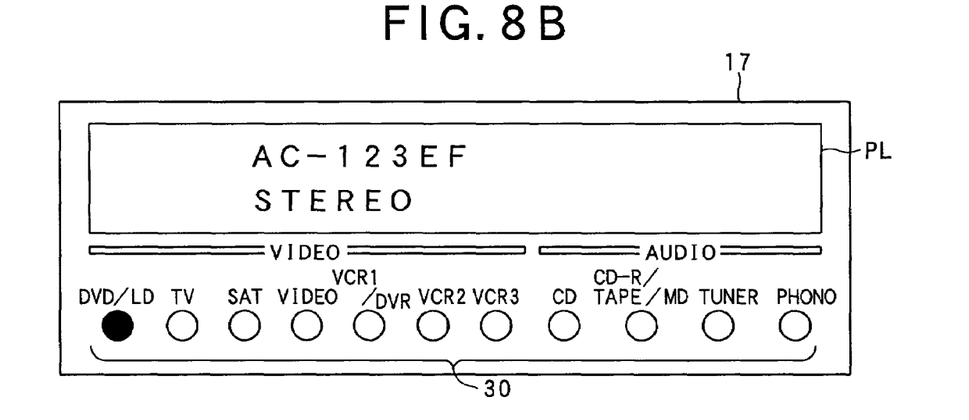
FIG. 8B is a diagram showing a second example of display screen according to an embodiment.
Figure 8C:
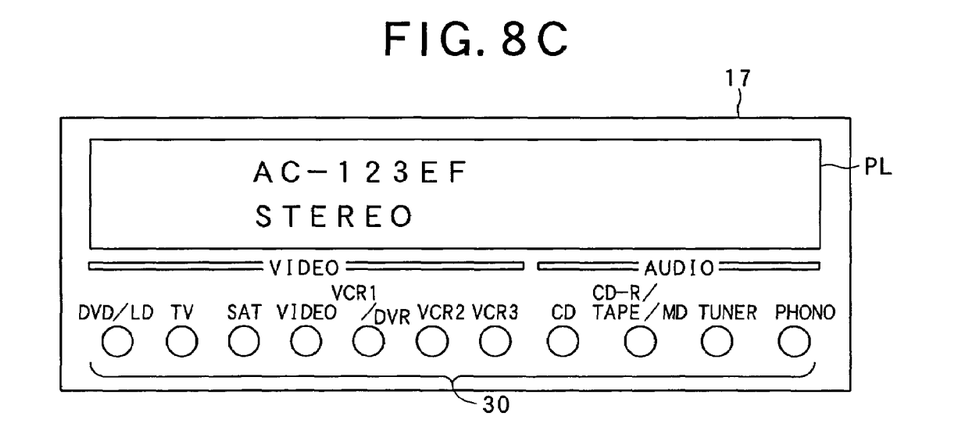
FIG. 8C is a diagram showing a third example of display screen according to an embodiment.

FIG. 7 is a flowchart showing the switching process, and FIG. 8 a diagram showing an example of display on the display unit 17 when the dynamic image information or the like is being received after the switching process.

The function switching process described below is for switching between a fixed function assigned a node by the device assignment process and another fixed function not assigned the particular node, which may coexist.

In the function switching process according to an embodiment, as shown in FIG. 7, the first step is to confirm whether the operation has been performed on the input operation unit 16 to switch to (or select) any of the functions (step S20).

In executing the function switching process, it is confirmed whether the function of the destination indicated by the particular operation is the original fixed function of the receiver R or not (step S21).

When it is determined in step S21 that the switching destination designated is a fixed function (FIXED FUNCTION in step S21), it is then confirmed whether a node has been assigned to the fixed function of the switching destination (step S22). The process of step S22 is executed based on the assignment information stored in the EEPROM 15 by the process of step S13 shown in FIG. 4.

When it is determined in step S22 that no node is assigned to the fixed function of the switching destination (NO in step S22), the information from a non-applicable device to be originally selected as a fixed function is received and output (step 23) thereby to terminate the function switching process according to this embodiment.

The display operation of the display unit 17 for executing the process of step S23 will be explained with reference to FIG. 8A. As described above, in the process of step S23, the information from a non-applicable device to be selected is received as one of the original fixed functions of the receiver R. Among a plurality of indicators 30 indicating the particular fixed functions (i.e. the fixed functions not assigned a node) on the display unit 17, those corresponding to the currently selected fixed functions are turned on. At the same time, the attribute of the non-applicable device connected to the particular fixed functions is displayed on the display panel PL. In the example shown in FIG. 8A, it can be recognized from the display of the indicator 30 that the fixed function corresponding to the input terminal to be currently connected with the DVD player or the LD (Laser Disc) player has been selected on the one hand and it is indicated on the display panel PL that the particular DVD player or the LD player, as the case may be, is connected on the display panel PL on the other.

Next, assume that it is determined in step S22 that the fixed function of the switching destination has been assigned a node (YES in step S22). The process of receiving and outputting the information from the node so assigned is executed (step S24) thereby to terminate the function switching process according to this embodiment.

The display operation of the display unit 17 for executing the process of step S24 will be explained with reference to FIG. 8 B. As described above, in the process of step S24, the information is received from a node assigned later to the original fixed functions of the receiver R. Therefore, one of the indicators 30 of the display unit 17 showing the particular fixed function (i.e. the fixed function assigned a node) is turned on. At the same time, the attribute of the node assigned to the fixed function is displayed on the display panel PL. In the example shown in FIG. 8B , it can be recognized from the display of the indicator 30 that a node is assigned to a fixed function currently to be selected as a DVD player or a LD player. At the same time, the name and the attribute of the node assigned are displayed on the display panel PL.

When it is determined in step S21 that the designated switching destination is not a fixed function (VIRTUAL FUNCTION in step S21), it indicates that one of the nodes is to be selected currently as a virtual function. Therefore, the information from the node to be selected as a virtual function is received and output (step S25) thereby to terminate the function switching process according to this embodiment.

The display operation of the display unit 17 for executing the process of step S25 will be explained with reference to FIG. 8C. As described above, in the process of step S25, the information is received from a node connected to the receiver R through the serial bus B and not assigned to the fixed function. Therefore, none of the indicators 30 of the display unit 17 is turned on, and the name and the attribute of the node connected to the virtual function are displayed on the display panel PL. In the example shown in FIG. 8C, the turned-off state of the indicators 30 makes it possible to recognize that the virtual function has been selected. At the same time, the name and the attribute of the node connected to the virtual function are displayed on the display panel PL.

(E) Assignment Status Restoration Process According to Embodiment

Finally, with reference to FIGS. 9 and 10, an explanation will be given about the process of restoring the assignment status executed mainly by the main microcomputer 13 when a bus reset occurs during the actual receipt of the dynamic image information or the like by the receiver R after completion of the device assignment process and the function switching process or when the power switch of the receiver R is turned on soon after being turned off.

Figure 9:
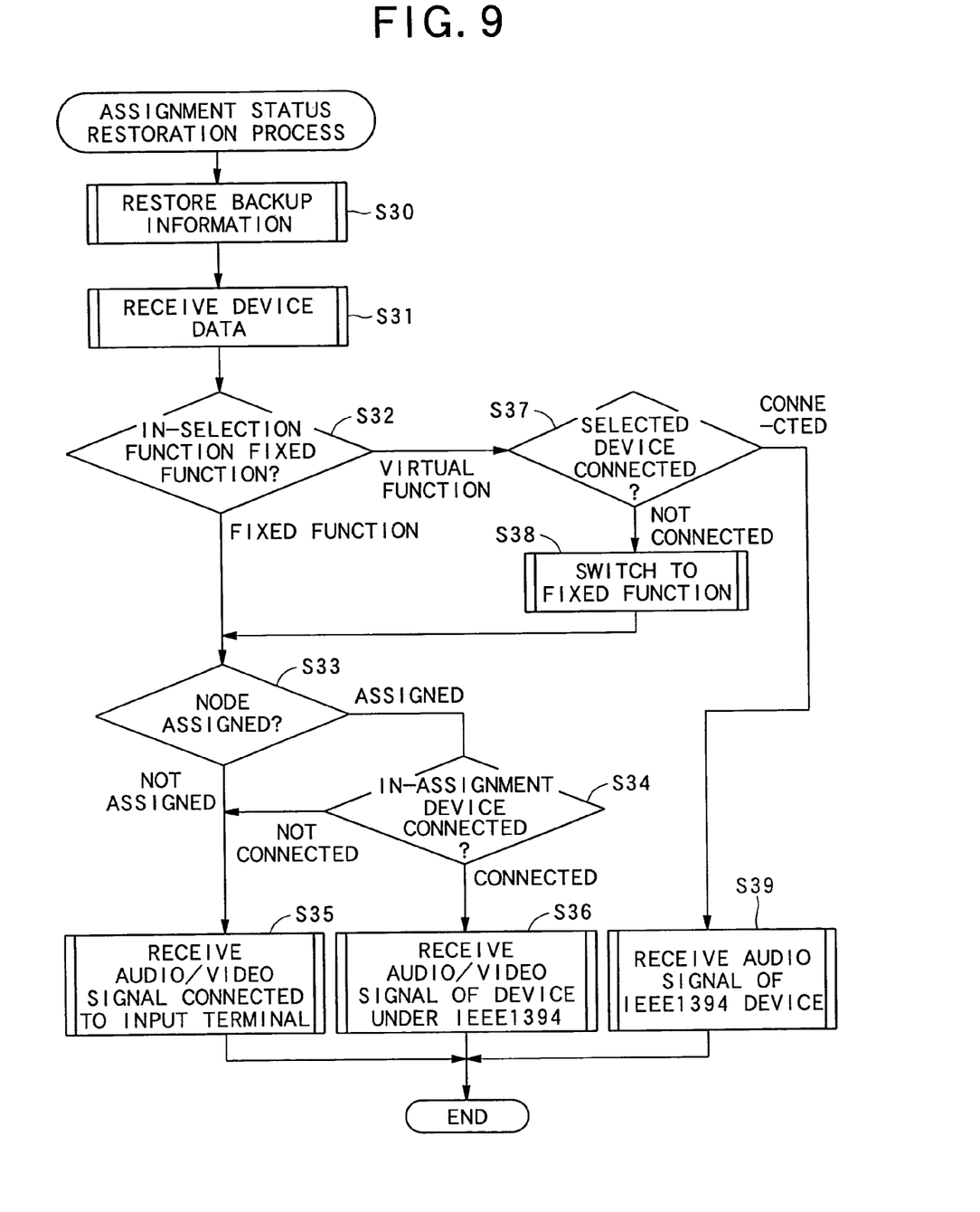
FIG. 9 is a flowchart showing the assignment status restoration process according to an embodiment.
Figure 10:
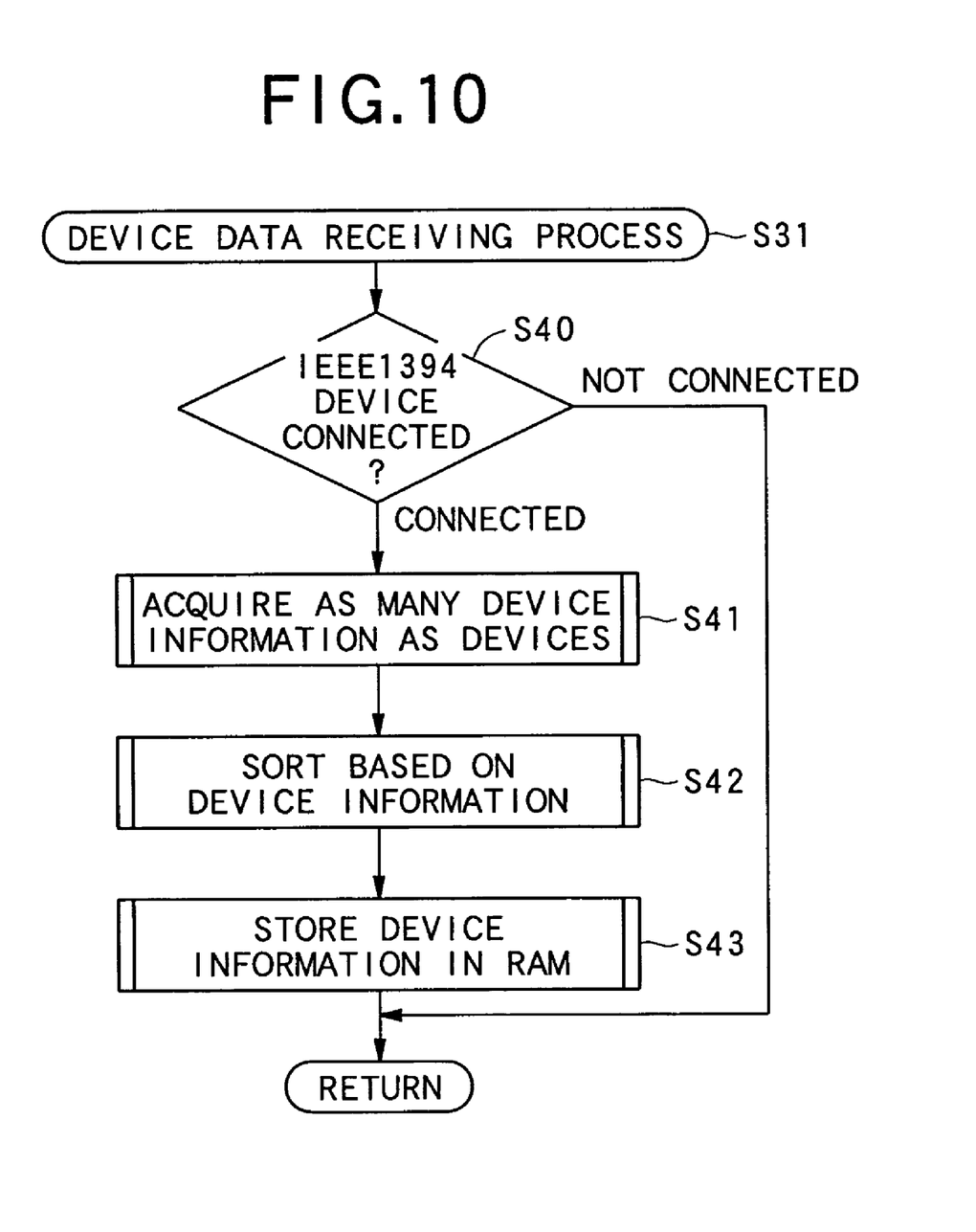
FIG. 10 is a flowchart showing the device data receiving process according to an embodiment.

FIG. 9 is a flowchart showing the restoration process, and FIG. 10 a diagram showing an example of display on the display unit 17 during the receipt of the dynamic image information or the like after the particular restoration process.

The process of restoring the assignment status described below is the process of restoring the immediately preceding assignment status when a bus reset occurs or the power switch of the receiver R is turned on.

In the process of restoring the assignment status according to this embodiment, as shown in FIG. 9, a bus reset occurs or the power switch is turned on first. Then, the assignment information stored in the EEPROM 15 is read (step S30), and the device information of each node connected currently on the serial bus B is acquired (step S31). The process of step S31 will be explained in detail later.

Upon complete acquisition of the device information, it is confirmed whether the function that has been selected immediately before the occurrence of a bus reset or the turning off of the power switch of the receiver R is the original fixed function of the receiver R or not (step S32).

When it is determined in step S32 that the selected function is a fixed function (FIXED FUNCTION in step S32), it is confirmed whether a node is assigned to the selected fixed function (step S33). At the same time, the process of step S33 is executed based on the assignment information read by the process of step S30.

When it is determined in step S33 that the node is not assigned to the selected fixed function (NO in step S33), the information from the non-applicable device originally to be selected as a fixed function is received and output (step S35) thereby to terminate the process for restoring the assignment information according to this embodiment.

With regard to the display operation of the display unit 17 for executing the process of step S35, the information from the non-applicable device to be selected as one of the original fixed functions of the receiver R is received as it is, and therefore the display on the display unit 17 is similar to that illustrated in FIG. 8A above.

Next, when it is determined in step S33 that a node is assigned to the selected fixed function (YES in step S33), it is determined based on the result of the process of step S31 whether the node thus assigned is actually connected or not on the serial bus B (step S34).

When the assigned node is actually connected on the serial bus B (CONNECTED in step S34), the process is executed for receiving and outputting the information from the node thus connected (step S36) thereby to terminate the process of restoring the assignment information according to this embodiment.

With regard to the display operation of the display unit 17 for executing the process of step S36, the information from the node assigned later to the original fixed function of the receiver R is received in the process of step S36. Therefore, the particular display operation of the display unit 17 is similar to that illustrated in FIG. 8B above.

When it is determined in step S34 that the assigned node is not actually connected on the serial bus B (NOT CONNECTED in step S34), on the other hand, the information from the assigned node is impossible to receive. Therefore, the process is started to receive the information from the non-applicable device to be selected as the original fixed function (step S35).

When it is determined in step S32 that the selected function is not a fixed function (VIRTUAL FUNCTION in step S32), on the other hand, it means that one of the nodes is to be selected currently as a virtual function. Thus, it is determined based on the result of the process in steps S31 whether the designated node is actually connected on the serial bus B or not (steps S38).

When the node assigned as a virtual function is actually connected (CONNECTED in step S37), the process for receiving and outputting the information from the node to be selected as the virtual function is executed (step S39), and the process for restoring the assignment status according to this embodiment is terminated.

In view of the fact that the information from a node connected to the receiver R through the serial bus B and not assigned to a fixed function is received in the process of step S39, the display on the display unit 17 for executing the process of step S39 is similar to the case illustrated in FIG. 8C above.

When it is determined in step S37 that the node assigned as a virtual function is not actually connected on the serial bus B (NOT CONNECTED in step S37), the information from the assigned node is impossible to receive and therefore the function is switched to the fixed function (step S38) thereby to execute the process of step S33 and subsequent steps.

Next, the details of the process for receiving the device data in step S31 will be explained with reference to FIG. 10.

In the receiving process, as shown in FIG. 10, the first step is to confirm whether any node based on the serial bus standard other than the receiver R is currently connected on the serial bus B (step S40). When no node is so connected (NOT CONNECTED in step S40), the process directly proceeds to step S32. When any other node is so connected (CONNECTED in step S40), on the other hand, the device information as many as the nodes connected are acquired (step S41). The process of step S41 is executed more specifically as a series of the device recognition process explained with reference to FIG. 2.

Upon complete acquisition of the device information, the nodes are rearranged based on the acquired device information for each attribute of the nodes (step S42). After this rearrangement, the device information actually to be used are stored in the RAM (random access memory) not shown of the main microcomputer 14 (step S43), followed by proceeding to the original step S32. In step S42, the nodes are rearranged specifically in such an order that those nodes based on the A&M protocol which have acquired the device information is placed before the nodes not conforming with the A&M protocol. As the result of this rearrangement, the nodes based on the A&M protocol are displayed in priority as select candidates in the selection process of step S12 shown in FIG. 4.

As explained above, the information reproducing system S according to this embodiment so operates that the nodes connected by the serial bus B are assigned to a fixed function as one of input sources. Even when a plurality of nodes are connected to a single system of the serial bus B, therefore, the required one node can be selected both rapidly and easily. In this way, the information from the particular node can be input.

As long as the node is selected actually as an input source, the name indicating the particular node is displayed on the display panel PL. At the same time, the fixed function assigned is displayed identifiably. It is thus possible to identify the currently selected node while at the same time making it possible to recognize to which fixed function the node is assigned.

Further, when the information from a node not assigned to the fixed function is input, only the name indicating the node is displayed on the display panel PL. It is therefore possible to clearly recognize that the information from a node not assigned to the fixed function is input.

Furthermore, in assigning a node to a fixed function, only the nodes assignable to the particular fixed function are displayed to permit selection. Thus, a node failing to meet the required conditions is prevented from being assigned.

Also, the assignment information is stored in the EEPROM 15. Even when a node assigned to a fixed function is reconnected to the serial bus B after being separated from the serial bus B, therefore, the particular node can be assigned to a fixed function without repeating the device assignment process.

Incidentally, the programs corresponding to the flowcharts shown in FIGS. 2, 4, 5, 7, 9 and 10 are stored in "a computer-readable storage medium such as a flexible disc or a hard disc, or acquired through a transmission medium such as a network such as the Internet." By reading and executing these programs by a general-purpose microcomputer or the like, the particular microcomputer or the like can be rendered to function as the main microcomputer 13 or the host microcomputer 12 according to the embodiments of the invention.

The invention may be embodied in other specific forms without departing from the spirit or essential characteristics thereof The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-276388 filed on Sep. 20, 2002 including the specification, claims, drawings and summary is incorporated herein by reference in its entirety.

What is claimed is:

1. An information processing apparatus connected to first information processing means via a bus single system, both the bus and said first information processing means being provided outside the information processing apparatus, comprising:

a bus inputting terminal connected to the bus;

another inputting terminal directly connected to second information processing means, wherein said second information processing means does not conform to the standard that the bus is based on and are provided outside the information processing apparatus;

a selecting device for selectively inputting input information supplied from a plurality of input sources;

an acquisition device for acquiring first information for specifying said first information processing means connected through the bus; and a setting device for setting one of said first information processing means in place of one of the plurality of the input sources, the input sources being for said second information processing means, as an alternative in the selecting device, based on the acquired first information.

2. The information processing apparatus according to claim 1, further comprising:
a first indication device for indicating the first information corresponding to the selected one of said first information processing means when the one of said first information processing means set as one of the alternatives is selected as the input source; and
a second indication device for indicating the one of the input sources replaced by the currently selected one of the first information processing means, in parallel with the indication by the first indication device.

3. The information processing apparatus according to claim 1, further comprising an indication device for indicating only the first information corresponding to said first information processing means supplied with the input information when the input information from said first information processing means not set as the alternative is input through the bus.

4. The information processing apparatus according to claim 1, wherein:
the setting device includes:
an extraction device for extracting, based on the acquired first information, only those of said first information processing means meeting the conditions selectable as one of the alternative among the plurality of said first information processing means in setting one of said first information processing means as the one of the alternatives; and
a display device for displaying only the extracted first information processing means.

5. The information processing apparatus according to claim 1, further comprising a storage device for storing the acquired first information.

6. The information processing apparatus according to claim 1, wherein the bus is a serial bus based on IEEE 1394 standard.

7. An information processing method executed by an information processing apparatus connected to first information processing means via a bus of a single system, both the bus and said information processing means being provided outside the information processing apparatus, the information processing apparatus comprising a bus inputting terminal connected to the bus and another inputting terminal directly connected to second information processing means, wherein said second information processing means does not conform to the standard that the bus is based on and are provided outside the information processing apparatus, the method comprising:

a selecting process of selectively inputting the input information supplied to the information processing apparatus from each of a plurality of input sources;
an acquisition process of acquiring first information for specifying said first information processing means connected through the bus; and
a setting process of setting the one of said first information processing means, as an alternative in the selecting process, in place of any one of the plurality of the input sources, the input sources being for said second information processing means, based on the acquired first information.

8. A computer-readable storage medium storing a computer program representing a sequence of instructions which when executed by a computer included in an information processing apparatus connected to first information processing means via a bus of a single system, both the bus and said information processing means being provided outside the information processing apparatus, the information processing apparatus comprising a bus inputting terminal connected to the bus and another inputting terminal directly connected to second information processing means, wherein said second information processing means does not conform to the standard that the bus is based on and are provided outside the information processing apparatus, the instructions cause the computer to function as:
a selecting device for selectively inputting the input information supplied from a plurality of input sources;
an acquisition device for acquiring first information for specifying said first information processing means connected through the bus; and
a setting device for setting one of said first information processing means in place of one of the plurality of the input sources, the input sources being for said second information processing means, as an alternative in the selecting device, based on the acquired first information.

9. The information processing apparatus according to claim 1, wherein the first information processing means and the second information processing means each comprise a plurality of information processing means.

10. The information processing method according to claim 7, wherein the first information processing means and the second information processing means each comprise a plurality of information processing means.

11. The computer program according to claim 8, wherein the first information processing means and the second information processing means each comprise a plurality of information processing means.

* * * * *